United States Patent [19]
Herbst

[11] Patent Number: 5,891,378
[45] Date of Patent: Apr. 6, 1999

[54] METHOD FOR HANDLING INSERTS TO BE PLACED INTO CAVITIES OF A MOLD OF AN INJECTION MOLDING MACHINE

[76] Inventor: Richard Herbst, Freisinger Strasse 3b, D-85386 Eching, Germany

[21] Appl. No.: 721,061

[22] Filed: Sep. 26, 1996

[30] Foreign Application Priority Data

Oct. 3, 1995 [DE] Germany ............... 195 36 876.2

[51] Int. Cl.[6] ............... B29C 33/12; B29C 45/14
[52] U.S. Cl. ............... 264/277; 264/278; 264/297.1
[58] Field of Search ............... 264/271.1, 275, 264/277, 278, 261, 263, 297.1

[56] References Cited

U.S. PATENT DOCUMENTS

| | | | |
|---|---|---|---|
| Re. 20,193 | 12/1936 | Swarovski | 264/277 |
| 850,538 | 4/1907 | Newman | 264/277 |
| 2,163,814 | 6/1939 | Swarovski | 264/277 |
| 3,039,148 | 6/1962 | Pratt, Jr. et al. | 264/277 |
| 3,233,310 | 2/1966 | Corl | 264/278 |
| 3,349,158 | 10/1967 | Maynard | 264/277 |
| 3,439,087 | 4/1969 | Ledeen | 264/277 |
| 5,527,502 | 6/1996 | Kiuchi et al. | 264/263 |
| 5,693,277 | 12/1997 | Widmer | 264/275 |

FOREIGN PATENT DOCUMENTS 2 158 003 A  11/1985  United Kingdom.

*Primary Examiner*—Angela Ortiz
*Attorney, Agent, or Firm*—Knobbe, Martens, Olson & Bear, LLP

[57] ABSTRACT

A method and an apparatus for handling inserts to be placed into a plurality of cavities of a mold of a plastic material injection molding machine are disclosed. The plurality of inserts comprises at least one first insert having a first position and a first orientation when placed into an associated first cavity in the mold, and at least one second insert having a second position and a second orientation when placed into an associated second cavity in the mold. The inserts are assembled into a group of inserts where they are arranged to have a position and an orientation relative to each other corresponding to the positions and orientations within the mold. The inserts are then placed from the group of inserts into the cavity.

6 Claims, 3 Drawing Sheets

METHOD FOR HANDLING INSERTS TO BE PLACED INTO CAVITIES OF A MOLD OF AN INJECTION MOLDING MACHINE

FIELD OF THE INVENTION

The invention relates to the field of plastic material injection molding machines and, more specifically, the invention relates to a method and an apparatus for handling inserts to be placed into a plurality of cavities of a mold of a plastic material injection molding machine.

BACKGROUND OF THE INVENTION

It is known to injection-embed parts during the injection process in the injection molding of plastic objects. These parts may be, for example, reinforcements, hinges, fastening parts, metallic contact elements of electrical plug connections, or the like.

It is further known in the injection molding of plastic objects to use molds in which corresponding mold cavities are arranged in a parting plane of the mold. For reasons relating to injection technology, it is often necessary in the process for the individual mold cavities to be different in terms of the orientation of the objects embedded therein. The mold cavities may thus, for example, be oriented in a star shape with respect to a common central supply conduit.

When, in this instance, inserts of the aforesaid kind need to be introduced into the mold cavities prior to the injection molding process, it is important for the relevant insert in each mold cavity to be placed in the respective orientation of the mold cavity.

Previously known handling systems have archived this object in a very complicated manner, by the fact that the handling system assumes a new orientation for each individual mold cavity. This requires considerable programming effort and can lead to malfunctions during operation, in particular if the cycle times of the plastic injection molding machine are to be kept as short as possible.

In addition, multiple inserts are often provided for each mold cavity, for example in the case of electrical plug connections in which multiple metallic contact elements are injection-embedded in plastic. Four mold cavities may, for example, be provided, in each of which five inserts are arranged. The total of twenty inserts must then be quickly placed in a confined space, each in the correct position and in the predefined alignment.

Published UK patent application 2 158 003 discloses an automatic continuously cycleable molding system for manufacturing semi-conductor components. The system is fed with leadframes which are pre-arranged in a first station in groups of e.g., 14 leadframes and are then jointly transferred by a second station into a cavity of a mold. All of the leadframes in the group are arranged in parallel, e.g., in 2 rows of 7 leadframes each. The 14 leadframes are then jointly injection-molded. They are separated from each other later on for obtaining 14 individual embedded components.

SUMMARY OF THE INVENTION

In one aspect, the present invention provides a plurality of inserts comprising at least one first insert having a first position and a first orientation when placed into an associated first cavity in the mold, and at least one second insert having a second position and a second orientation when placed into an associated second cavity in the mold, the second orientation being different from the first orientation.

One object of the invention is to develop a handling system of the aforesaid kind in such a way that the aforementioned disadvantages are eliminated. In particular, the handling system, active directly on the plastic injection molding machine, is to have abbreviated and simplified cycle times.

In a handling system of the aforesaid kind, this object is achieved by the fact that a first handling apparatus is provided which assembles the inserts into groups before placement, the orientation of the inserts in the group being the same as the orientation of the inserts in the mold cavities; and that a second handling apparatus is provided which places the inserts of the group into the mold cavities.

This and further objects are achieved by a method as specified at the outset and comprising the steps of:

assembling at least the first insert and the second insert into a group of inserts, the first insert and the second insert being arranged in the group to have a position and an orientation relative to each other corresponding to the first and second positions and orientations, respectively; and placing the inserts from the group of inserts into the cavities.

The object and other objects are, further, achieved by the apparatus as specified at the outset and comprising:

first handling means for assembling at least the first insert and the second insert into a group of inserts, the first insert and the second insert begin arranged in the group to have a position and an orientation relative to each other corresponding to the first and second positions and orientations, respectively; and second handling means for placing the inserts from the group of inserts into the cavities.

Specifically, in the system according to the invention the inserts are already offered, by the activity of the first handling apparatus, in an orientation which corresponds to the orientation of the multiple inserts within that same group in the corresponding mold cavities of the mold. It is therefore possible, for example, to proceed, as in the prior art, from a delivery of inserts on pallets in which the inserts are all approached in the same orientation. The first handling apparatus then orients and optionally positions the inserts in groups so that they can be brought and placed, essentially unchanged, into the mold cavities.

The problem of positioning and orienting the inserts is thus displaced to a region outside the actual plastic injection molding machine and dealt with separately, so that the entire procedure can take place more quickly; for example, the process times for injection molding into the mold can be utilized so that the next group of inserts is already oriented and positioned in the requisite manner.

In a preferred embodiment of the invention, the inserts are delivered to the first handling apparatus in a quantity that is not equal to the quantity in the group, preferably individually.

The advantage of this feature is that conventional delivery devices, with which the inserts are delivered individually, or for example in pairs, from a reservoir, can be used.

It is preferable in this context if the first handling apparatus assembles the inserts into complete, oriented groups.

The advantage of this feature is that after leaving the first handling apparatus, the entire group is already completely available in an orientation which corresponds to the orientation of the mold cavities.

In an alternative exemplified embodiment of the invention, however, the first handling apparatus only orients the inserts individually, and a mover is provided which assembles the individually oriented inserts into complete, oriented groups.

The advantage of this feature is that a higher flow rate in the system is possible, since the inserts, delivered for example individually, are each individually oriented, so that the flow of inserts which leaves the first handling apparatus is equal to the flow of inserts that are delivered to the first handling apparatus.

In this case, it is particularly preferred if the group consists of rows and columns, and the mover assembles the inserts, delivered in individually oriented fashion by the first handling apparatus, into the groups line by line.

The advantage of this feature is that the sequence further downstream from the first handling apparatus can also be designed without intermediate buffers, since the individually forwarded (and already oriented) inserts are assembled line by line, in succession, into the groups.

In another group of exemplified embodiments, the individual parts are delivered to the first handling apparatus in a quantity which corresponds to the quantity in the group.

The advantage of this feature is that at the cost of a somewhat greater complexity in delivering the inserts from the reservoir to the first handling apparatus, the further sequence can be made faster because the inserts are conveyed in groups from the start.

In the context of the present invention, it is particularly preferred if the inserts are delivered to the first handling apparatus on workpiece carriers or pallets.

The advantage of this feature is that standard conveying devices can be used, which need only be correspondingly modified in each case for different inserts.

In preferred developments of this exemplified embodiment, the inserts can be oriented either on the pallets or together with them, depending on which is more advantageous in the individual case.

If the inserts are delivered to the first handling apparatus already in groups, and are arranged for that purpose on pallets, it is particularly preferred if the inserts are arranged on the pallets at positions whose mutual relative coordinates correspond to the mutual relative coordinates of the mold cavities, and the first handling apparatus simply orients the inserts on their positions.

The advantage of this feature is that after leaving the first handling apparatus an arrangement of inserts is present which allows a direct transfer, i.e., a placement, into the mold cavities.

A particularly good effect is achieved by the fact that the second handling apparatus places the inserts into the mold cavities in groups.

Lastly, it is preferred if the first and second handling apparatus are structurally combined.

Further advantages are evident from the description and the attached drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

Exemplary embodiments of the invention are depicted in the drawings and will be explained in more detail in the description below. In the drawings:

FIG. 1a is a bottom view of a mold half of the molding machine of FIG. 1;

FIG. 2a is a bottom view of a mold half of the molding machine of FIG. 2;

DESCRIPTION OF THE PREFERRED EMBODIMENTS

Figure 1:
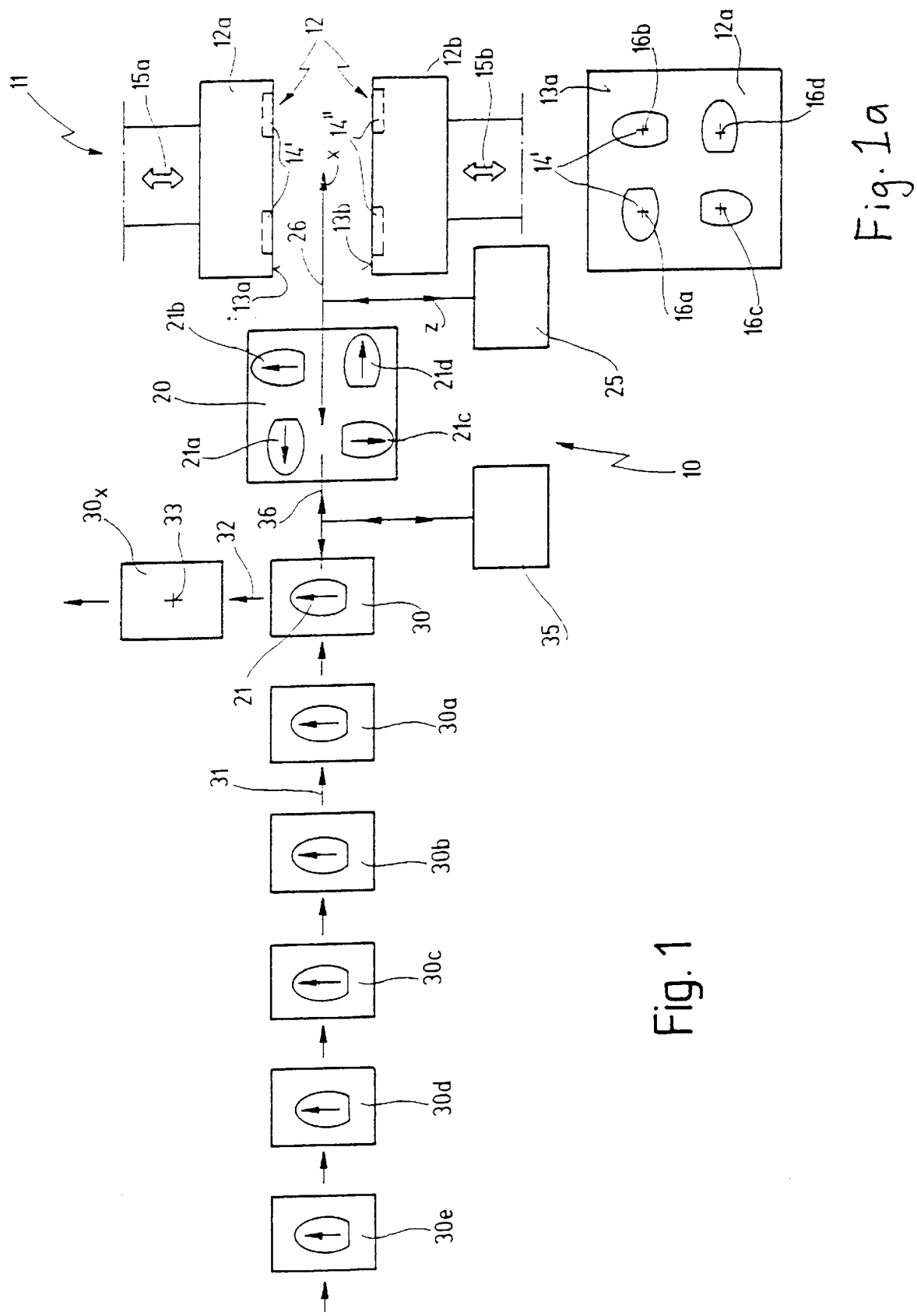
FIG. 1 shows a schematic depiction of a first exemplified embodiment of a handling system according to the invention for use with a molding machine.

In FIG. 1, a handling system according to the present invention is designated overall with the number 10. A plastic injection molding machine 11, which is merely indicated in highly schematic fashion in FIG. 1, has a mold 12 that in turn comprises two mold halves 12a, 12b. Mold halves 12a, 12b are equipped with surfaces 13a, 13b which rest against one another when mold 12 is closed.

Mold cavities 14', 14" are recessed into surfaces 13a, 13b. When mold 12 is moved from the open position depicted in FIG. 1 into a closed position, as indicated by arrows 15a, 15b, surfaces 13a, 13b rest, as mentioned, against one another, and mold cavities 14', 14" can be filled, in a manner known in the art and therefore not depicted again, with plastic compound.

Surface 13a of mold half 12a is depicted at the lower right of FIG. 1 in a side view. It is evident that mold cavities 14' are arranged at specific positions 16a–16d which are spaced apart from one another by specific coordinate distances. It is further evident from this depiction that mold cavities 14' are oriented, as will be explained later.

Located to the left in FIG. 1 next to mold 12 is a first workpiece carrier, specifically a first pallet 20. Four inserts 21a–21d are arranged on first pallet 20. Arrows in inserts 21a–21d indicate that they are differently oriented. As may easily be seen, the orientation of inserts 21a–21d corresponds to the orientation of mold cavities 14' in surface 13a.

A first handling apparatus 25 serves to place inserts 21a–21d into mold cavities 14' or 14". First handling apparatus 25 has a first handling arm 26 for this purpose. First handling arm 26 can preferably be displaced in a plurality of coordinates, as indicated by x and y. Moreover, first handling arm 26 can also be moved in further degrees of freedom, for example by rotating, tilting and the like.

Second workpiece carriers or pallets, designated in FIG. 1 as 30 and 30a–30e are provided to deliver the insert. In the exemplified embodiment depicted, each of these second pallets 30, 30a–30e carries a single insert 21. Second pallets 30, 30a–30e are displaced in succession into a position to the left of first pallet 20, as indicated by arrows 31 for a first transport direction. They are then, after the removal of insert 21, moved away again in a second direction 32, as indicated by an empty second pallet 30x, on which the now-empty position 33 for insert 21 is evident.

A second handling apparatus 35 is located between first pallet 20 and second pallet 30 that is brought in next. Second handling apparatus 35 has a second handling arm 36 which can also be moved along a plurality of coordinates or degrees of freedom.

It is understood in this context that an "insert" is also to be understood as a set of such inserts. In FIG. 1, for example, insert 21 on pallet 30 can consist of a set of, for example, five identical or different parts, for example five metallic contact elements for an electrical plug connection. These can be delivered from different sources, i.e., from pallets, vibratory conveyors, die-cutting apparatuses, and the like.

The arrangement depicted in FIG. 1 operates as follows:

In a facility which operates a plastic injection molding machine 11 with associated handling system 10, the inserts are usually supplied by a subcontractor. The subcontractor supplies inserts 21, if possible, in a form in which they can best be transported in large quantities, i.e., as far as possible in stacked and compact form. Inserts 21 are then loaded onto second pallets 30, if this is not already done by the subcontractor. Second pallets 30 are populated uniformly with inserts 21 so that the latter are arranged either individually or severally in the same alignment on second pallets 30.

Inserts 21 arrive in the working area of handling system 10 in this form. Second handling system 35 then removes insert 21 from the respective next second pallet 30, and transfers it onto first pallet 20. During this transfer, insert 21 is not simply brought into a position which corresponds to positions 16a–16d in mold 12, but rather inserts 21a–21d are also oriented, specifically in an orientation (for example "to the right," "to the left," "upward," "downward," "tilted down 30 degrees from the horizontal to the left," etc.) which corresponds to the orientation of mold cavities 14', 14" in mold 12. This results in the arrangement depicted in FIG. 1 of inserts 21a–21d on first pallet 20.

First handling apparatus 25 then needs only to remove inserts 21a–21d from the first pallet and bring them into the corresponding mold cavities 14', 14"; the orientation of inserts 21a–21d does not need to be changed further.

Placement can occur, for example, by the fact that first pallet 20 travels into the gap between mold halves 12a, 12b so that inserts 21a–21d each need to be placed only a short distance; in the direction of arrows 15a, 15b, into the associated mold cavities 14', 14". This can be done in each case individually or severally.

Mold halves 12a, 12b are closed after placement, so that the injection process can then take place. During the closing movement, the injection process, and the subsequent opening movement, the next group of four inserts 21a–21d can, in order to save time, be already removed by second handling apparatus 35 from the next second pallets 30a–30d, and arranged on first pallet 20 in correct position and orientation.

Figure 2:
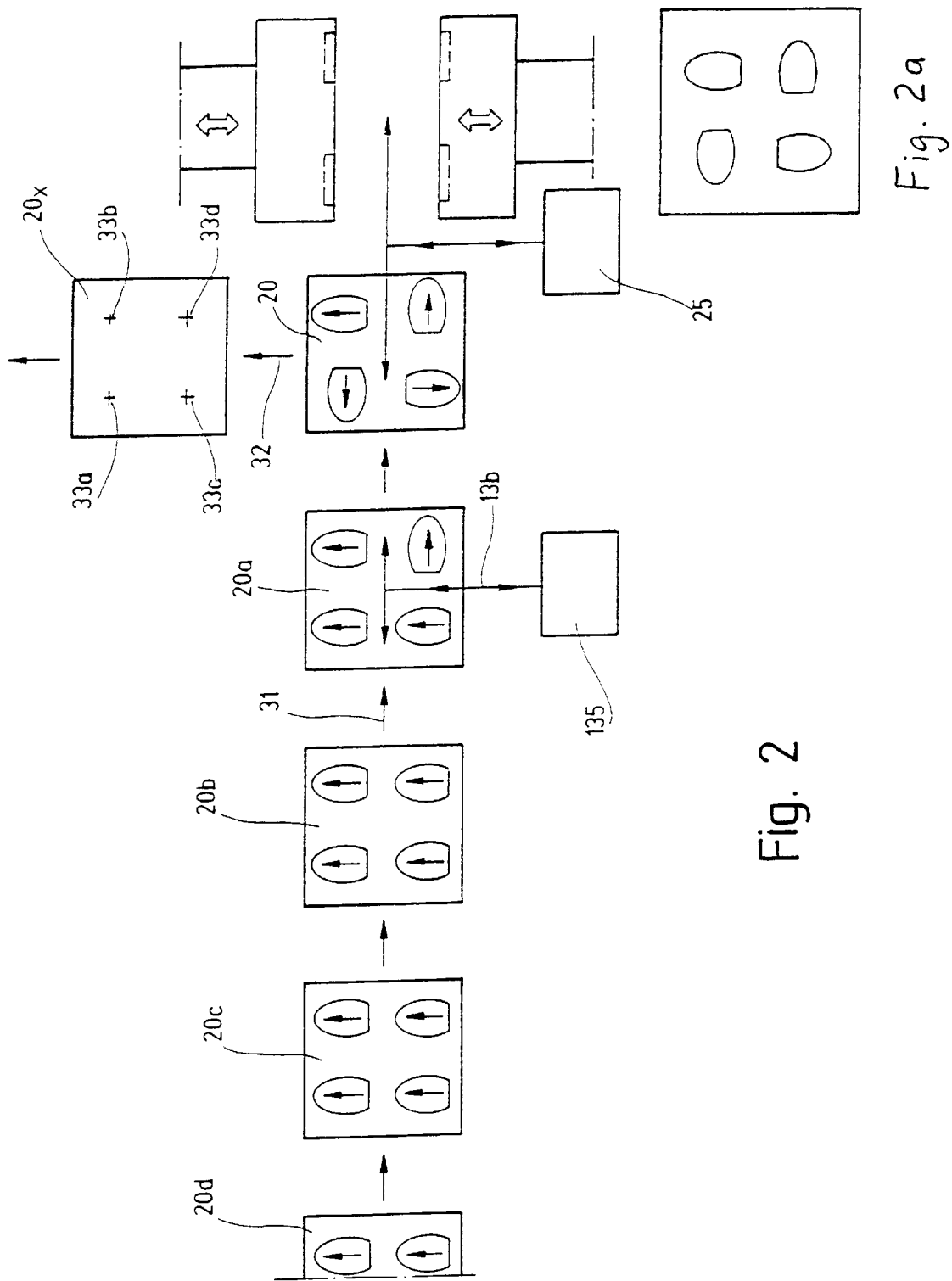
FIG. 2 shows a depiction similar to FIG. 1, but for a second exemplified embodiment of a handling system according to the invention.

In the variant depicted in FIG. 2, the sequence is fundamentally the same as in the arrangement according to FIG. 1. To save additional time, provision is simply made therein for second pallets 20a–20d to be in this case substantially identical in configuration to the first pallet 20. In this case the inserts are supplied already in the final position (FIG. 2a), but still with a homogeneous orientation. In this case second handling system 135 with a second handling arm 136 needs only to reorient the inserts on second pallet 20a, while the position does not have to be changed.

In this case first pallet 20 can even be omitted as an independent component, since second pallets 20a–20d move into the region of the first pallet 30 and can be processed there in the same way as was the case with the first pallet 20 in the exemplified embodiment according to FIG. 1. Empty pallet 20x is then moved back out, for example in direction 32 offset 90 degrees, as is clearly evident from FIG. 2. Also evidence therefrom are positions 33a–33d on which the inserts were previously located.

It is apparent that in this manner it is possible, in the case of molds with a plurality of mold cavities of different orientations and workpieces that are equipped with inserts, to achieve a substantial time saving and a simplification of the handling apparatus.

Figure 3:
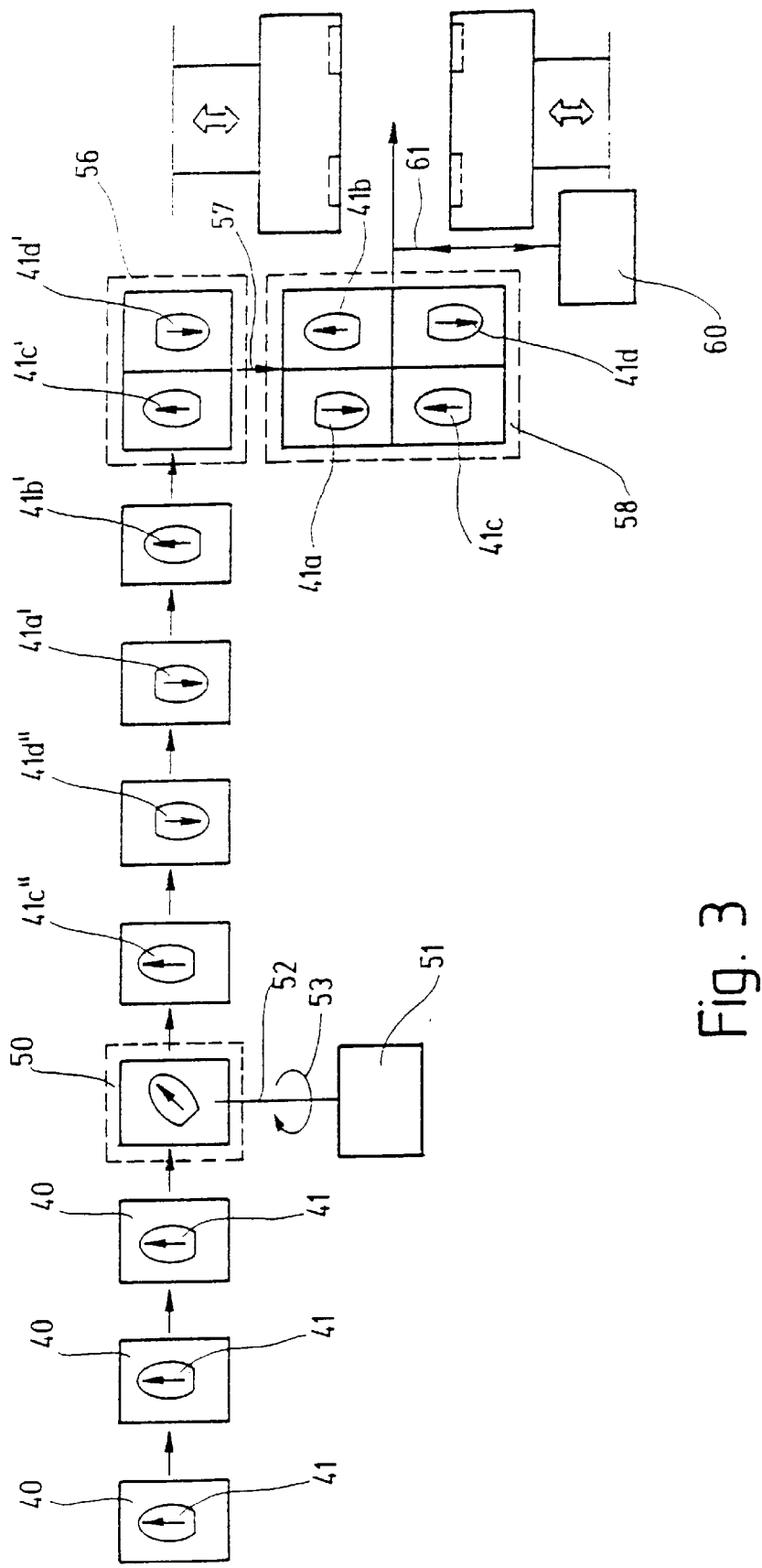
FIG. 3 shows a further depiction similar to FIG. 1, but for a third exemplified embodiment of a handling system according to the invention.

In the handling system depicted in FIG. 3, similarly to the situation in the exemplified embodiment according to FIG. 1, once again individual pallets 40 are used on each of which an insert 41 is located. The individually delivered inserts 41 first pass into the region of an orientation station 50. Associated with orientation station 50 is a first handling apparatus 51 with a first handling arm 52. An arrow 53 indicates that first handling apparatus 51 makes it possible to orient the respective insert located in orientation station 50. This can be done by the fact that, as depicted in FIG. 3, only the insert is oriented on the pallet. Alternatively, however, the entire pallet with the insert located on it can be oriented.

After leaving orientation station 50 the inserts have, in a predefined manner, a different orientation, as remains to be explained.

The pallets with the inserts located thereon finally pass onto a mover 56 on which, in the exemplified embodiment depicted, two pallets are combined in each case. An arrow 57 indicates that the two pallets in each case are delivered to a preparation station 58 on which in each case two successive pairs of pallets, i.e., a total of four pallets, are arranged.

The four pallets depicted in FIG. 3 in preparation station 58 are intended, by way of example, to also correspond to the four mold cavities, as was already explained earlier with respect to FIGS. 1 and 2. The numbers 41a, 41b, 41c and 41d designate the four orientations of the insert in preparation stations 58. Inserts 41 and 41b constitute a top row, and inserts 41c and 41d constitute a bottom row of the group of inserts, consisting of a total of two rows and two columns, in preparation station 58.

The four inserts 41a–41d can now be placed into the mold cavities in the manner already described, by means of a second handling apparatus 60 which has a second handling arm 61. This is done preferably by the fact that second handling arm 61 grasps all four inserts 41a–41d together, and places them together into the four associated mold cavities.

Turning now to the system upstream, it is evident that the next row with two inserts 41c', 41d', which after placement of the four inserts 41a–41d is to be transferred to the bottom position in the preparation station 58, is already ready in mover 56. Upstream from converter 56, in turn, two further inserts 41a' and 41b' are being brought in, and after inserts 41c' and 41d' have been moved will pass onto mover 56 so as thereafter also to be delivered to preparation station 58 in the top row of the group. As soon as this has happened, preparation station 58 would once again be populated with four correctly oriented inserts 41a', 41d'.

Further upstream it is evidence that the first row 41c", 41d" of the next-butane group, which ultimately will be arranged in the bottom row of preparation station 58, has already been oriented at the output of orientation station 50.

What is claimed is:

1. A method for handling inserts of at least three different orientations to be placed into a plurality of cavities of a mold of a plastic material injection molding machine, said inserts comprising at least one first insert having a first position and a first orientation when placed into an associated first cavity in said mold, said insert further comprising at least one second insert having a second position and a second orientation when placed into an associated second cavity in said mold, said insert further comprising at least one third insert having a third position and a third orientation when placed into an associated third cavity in said mold, the method comprising the steps of:

assembling at least said first insert, said second insert and said third insert into a group of inserts, said first insert, said second insert and said third insert being arranged within said group to have a position and an orientation relative to each other corresponding to said first position, said second position and said third position, respectively, and said first orientation, said second orientation and said third orientation, respectively; and placing said first, second, and third inserts from said group of inserts into said plurality of cavities.

2. A method for handling inserts to be placed into a plurality of cavities of a mold of a plastic material injection molding machine, said inserts comprising a plurality of first inserts having first positions and a first orientation when placed into an associated plurality of first cavities in said mold, said inserts further comprising a plurality of second inserts having second positions and a second orientation when placed into an associated plurality of second cavities in said mold, said second orientation being different from said first orientation, the method comprising the steps of:

individually orienting said first and second inserts;

feeding said first and second inserts one-by-one;

sub-assembling said first and second inserts into lines;

assembling said lines into a group of inserts line-by line, said group consisting of rows and columns, said plurality of first inserts and said plurality of second inserts being arranged within said group to have a position and an orientation relative to each other corresponding to said first positions and said second posit-ions, respectively, and said first orientation and said second orientation, respectively; and placing said first and second inserts from said group of inserts into said plurality of cavities.

3. A method for handling inserts to be placed into a plurality of cavities of a mold of a plastic material injection molding machine, said inserts comprising at least one first insert having a first position and a first orientation when placed into an associated first cavity in said mold, said inserts further comprising at least one second insert having a second position and a second orientation when placed into an associated second cavity in said mold, said second orientation being different from said first orientation, the method comprising the steps of:

feeding said first and second inserts on pallets;

assembling at least said first insert and said second insert into a group of inserts on said pallets, said first insert and said second inserts being arranged within said group to have a position and an orientation relative to each other corresponding to said first position and said second position, respectively, and said first orientation and said second orientation, respectively;

orientating said pallets; and placing said first and second inserts from said group of Inserts on said pallets into said plurality of cavities.

4. A method for handling inserts to be placed into a plurality of cavities of a mold of a plastic material injection molding machine, said plurality of cavities comprising a first number of cavities, said inserts comprising at least one first insert having a first position and a first orientation when placed into an associated first cavity in said mold, said inserts further comprising at least one second insert having a second position and a second orientation when placed into an associated second cavity in said mold, said second orientation being different from said first orientation, the method comprising the steps of:

feeding said first and second inserts on pallets, said pallets each being provided with a second number of inserts, said first number being an integral multiple of said second number;

assembling at least said first insert and said second insert into a group of inserts on said pallets, said first insert and said second inserts being arranged within said group to have a position and an orientation relative to each other corresponding to said first position and said second position, respectively, and said first orientation and said second orientation, respectively; and placing said first and second inserts from said group of inserts on said pallets into said plurality of cavities.

5. A method for handling inserts to be placed into a plurality of cavities including a first number of cavities of a mold of a plastic material injection molding machine, said inserts comprising:

at least one first insert having a first position and a first orientation when placed into an associated first cavity in said mold; and at least one second insert having a second position and a second orientation when placed into an associated second cavity in said mold, said second orientation being different from said first orientation, the method comprising the steps of:

feeding said first and second inserts on pallets, said pallets each being provided with a second number of inserts, said first number being an integral fraction of said second number;

assembling at least said first insert and said second inserts into a group of inserts on said pallets, said first insert and said second inserts being arranged within said group to have a position and an orientation relative to each other corresponding to said first position and said second position, respectively, and said first orientation and said second orientation, respectively; and placing said first and second inserts from said group of inserts on said pallets into said plurality of cavities.

6. A method for handling inserts to be placed into a plurality of cavities of a mold of a plastic material injection molding machine, said inserts comprising at least one first insert having a first position and a first orientation when placed into an associated first cavity in said mold; and at least one second insert having a second position and a second orientation when placed into an associated second cavity in said mold, said second orientation being different from said first orientation, the method comprising the steps of:

assembling at least said first insert and said second insert into a group of inserts, said first insert and said second insert being arranged within said group to have a position and an orientation relative to each other corresponding to said first position and said second position, respectively, and said first orientation and said second orientation, respectively; and placing said first and second inserts from said group of inserts into said plurality of cavities, said assembling step and said placing step being performed by machinery that is structurally integrated.

* * * * *